US008167326B2

(12) United States Patent
Izinger

(10) Patent No.: US 8,167,326 B2
(45) Date of Patent: May 1, 2012

(54) SEAT CUSHION

(76) Inventor: Maayan Izinger, Yakir (IL)

( * ) Notice: Subject to any disclaimer, the term of this patent is extended or adjusted under 35 U.S.C. 154(b) by 8 days.

(21) Appl. No.: 12/690,970

(22) Filed: Jan. 21, 2010

(65) Prior Publication Data

US 2010/0187791 A1 Jul. 29, 2010

Related U.S. Application Data

(60) Provisional application No. 61/146,669, filed on Jan. 23, 2009.

(51) Int. Cl.
*B62M 1/14* (2006.01)

(52) U.S. Cl. .................... 280/250.1; 297/43; 297/452.21

(58) Field of Classification Search ............... 280/250.1; 297/219.1, 452.31, 452.43–452.46, 452.21, 297/452.27; 5/652.1, 653, 724, 944
See application file for complete search history.

(56) References Cited

U.S. PATENT DOCUMENTS

| | | | | |
|---|---|---|---|---|
| 4,522,447 | A * | 6/1985 | Snyder et al. | 297/452.27 |
| 4,819,286 | A | 4/1989 | Beauchamp | |
| 5,352,023 | A * | 10/1994 | Jay et al. | 297/452.21 |
| 5,378,045 | A * | 1/1995 | Siekman et al. | 297/452.25 |
| 5,426,801 | A * | 6/1995 | Klearman et al. | 5/652 |
| 5,442,823 | A * | 8/1995 | Siekman et al. | 5/653 |
| 5,459,896 | A * | 10/1995 | Raburn et al. | 5/653 |
| 5,564,141 | A * | 10/1996 | Anderson | 5/668 |
| 6,009,578 | A * | 1/2000 | Davis | 5/653 |
| 6,256,819 | B1 * | 7/2001 | Maier et al. | 5/653 |
| 6,302,488 | B1 * | 10/2001 | Tanigaki et al. | 297/452.61 |
| 6,361,116 | B1 * | 3/2002 | Herbert | 297/452.27 |
| 6,625,830 | B2 * | 9/2003 | Lampel | 5/653 |
| 6,739,008 | B1 * | 5/2004 | Kindrick | 5/655.9 |
| 7,220,376 | B2 | 5/2007 | Hetzel et al. | |
| 7,334,278 | B2 * | 2/2008 | Yamasaki | 5/653 |
| 7,614,704 | B2 * | 11/2009 | Whelan et al. | 297/452.25 |
| 2006/0170274 | A1 * | 8/2006 | Moule | 297/452.25 |
| 2009/0121529 | A1 * | 5/2009 | Leeds | 297/219.1 |

* cited by examiner

*Primary Examiner* — Tashiana Adams

(57) ABSTRACT

Seat cushions that prevent a seated handicapped individual from sliding forward on the seat, while preventing the occurrence of decubitus ulcers. The seat a seat cushion includes a resilient body having a generally rectangular-cuboid-shape. The resilient body includes a frontal portion having a front end and a rear end, and which is fabricated from materials having a first density, and a rear portion having a front end and a rear end, and is fabricated from materials having a second density. The first density is substantially higher than the second density. Preferably, the resilient body is fabricated out of a sturdy foam material. Preferably, the seat cushion further includes a protective cover wrapping the resilient body.

15 Claims, 11 Drawing Sheets

SEAT CUSHION

CROSS REFERENCE TO RELATED APPLICATIONS

This application claims the benefit under 35 USC 119(e) from U.S. provisional application 61/146,669, filed on Jan. 23, 2009, the disclosure which is incorporated by reference for all purposes as if fully set forth herein.

FIELD OF THE INVENTION

This invention relates to seat cushions used to support individuals in a seated or otherwise reclined position. More particularly, the present invention relates to seat cushions typically used in wheelchairs, which seats structure help preventing a seated handicapped individual from sliding forward on the seat, while preventing the occurrence of decubitus ulcers.

BACKGROUND OF THE INVENTION

Wheelchair seat cushions are designed to perform a number of important functions. A seat cushion should be comfortable and capable of providing proper support for optimal posture and posture control, for a considerable length of time. A seat cushion should create stability and security for the person within the wheelchair. Seat cushions are often designed to help prevent and reduce the incidence of local pressure created by prolonged sitting on the cushion trying to uniformly spread the pressure on the external surface of the seating organs of the individual.

Many prior art attempts have been made to generally or individually fit the shape of the seat cushion to the anatomical shape of the user. For example, U.S. Pat. No. 4,588,229, given to Eric Jay, provides a seat cushion for the human body which comprises a pad comprising a flexible envelope containing a fluid filling material.

U.S. Pat. No. 4,819,286, given to David Beauchamp, provides a dry flotation cushion used on wheelchairs and a method for supporting dry flotation cushion used in wheelchairs. The structure includes a substantially rectangular rigid plate for inserting into the fabric covering of a dry flotation cushion for improving the support provided by a plurality of dry flotation cells when the dry flotation cushion is supported on the side frame members of a wheelchair.

U.S. Pat. No. 7,220,376, given to Thomas Hetzel et al, provides a negative impression of an anatomical portion of a person is captured by forcing the anatomical portion into impression foam to collapse the impression foam into the negative impression. The negative impression is obtained by collapsing the impression foam within the range of constant-force collapse distances, thereby creating the negative impression under conditions which reflect an equally-loaded anatomical portion. This invention is then used to fabricate wheelchair seat cushions.

U.S. Pat. No. 6,009,578, given to Steve Davis, provides a seat cushion for a wheelchair including a resilient wedge-shaped pad having an upper surface at an incline sloping downwardly from a higher end to a lower end. A plurality of spaced apart gel packs are on the upper surface of the resilient wedge-shaped pad. The gel packs closest to the higher end are of a high density, while other gel packs will decrease in density toward the lower end of the resilient wedge-shaped pad. The seat helps preventing a person from sliding off of the wheelchair.

The prior art shaped seat cushion are typically expensive to manufacture and do not necessarily address the problem encountered by handicapped individual, such as elderly individuals, that are sliding forwardly on top of the seat and are not able to pull themselves back. Often, a handicapped individual is not even aware of being in a slid seating position.

Reference is made to FIG. 2 (prior art), which is a cross-sectioned view showing person 10 properly positioned in wheelchair 20 seating system, on seat cushion 50. The back of person 10 is supported by back 30 of wheelchair 20. Pelvis 15 supported by both the lower end of back 30 and the end of seat cushion 50 proximal to back 30.

Reference is also made to FIG. 3 (prior art), which is a cross-sectioned view showing person 10 who has slid forward (in direction 40) and thereby improperly positioned in wheelchair 20 seating system, on seat cushion 50. Pelvis 15 is positioned away from the lower end of back 30 and is and is pointy pressing against seat cushion 50, thereby causing person 10 to develop decubitus ulcers. Furthermore, the sliding motion cause rubbing of the external surface of pelvis 15 of individual 10. Furthermore, as person 10 slides on seat cushion 50, the sliding motion accelerate as vector $F_H$, derived from the weight vector $F_V$ of person 10, is added to the motion forward in direction 40.

Reference is also made to FIG. 4 (prior art), which is a cross-sectioned view showing person 10 who is seating on wedge seat cushion 52, which is designed to prevent a seated handicapped individual 10 from sliding forward on seat cushion 52. Pelvis 15 is positioned away from the lower end of back 30 and is pointy pressing against seat cushion 52, thereby causing person 10 to develop decubitus ulcers.

There is a need for and it would be advantageous to have a seat cushion that prevents a seated handicapped individual from sliding forward on the seat, while preventing the occurrence of decubitus ulcers. It would be further advantageous for the seat cushion to be simple and inexpensive to manufacture.

SUMMARY OF THE INVENTION

By way of introduction, the principal intentions of the present invention include providing seat cushions that prevent a seated handicapped individual from sliding forward on the seat, while preventing the occurrence of decubitus ulcers. The seat cushions are made of two or more portions made of resilient materials, such as elastomeric materials, whereas the portion of the cushion distal from the back of the wheelchair is more rigid than the portion of the cushion proximal to the back of the wheelchair.

According to the teachings of the present invention there is provided a seat cushion for supporting a person seated on a chair, preferably a wheelchair, including a resilient body having a generally rectangular-cuboid-shape. The resilient body includes a frontal portion having a front end and a rear end, and which is fabricated from materials having a first density, and a rear portion having a front end and a rear end, and is fabricated from materials having a second density. The first density is substantially higher than the second density. Preferably, the resilient body is fabricated out of a sturdy foam material. Preferably, the seat cushion further includes a protective cover wrapping the resilient body.

The frontal portion is disposed distally from the back of the chair, while the rear portion is disposed proximal to the back of the chair. The front end of the rear portion is disposed adjacent to the rear end of the frontal portion.

Preferably, the rear portion is made of viscoelastic materials, to prevent decubitus ulcers.

Preferably, the front end of the rear portion is securely attached to the rear end of the frontal portion. Preferably, the seat cushion is securely attached to the back of the chair.

In variations of the present invention, the seat cushion of the invention further includes one or more intermediate portions, disposed between the fromtal portion and the rear pertion, wherein all of the portions maintain a gradual decrease in density starting at the front portion and ending at the portion.

In variations of the present invention, the frontal portion of the resilient body includes a divider having third density, wherein the divider laterally subdivides the frontal portion into two generally symmetric sections, wherein each of the symmetric sections facilitates comfort and stability for a respective thigh of the person sitting in the chair. The third density is higher than the first density.

In variations of the present invention, the frontal portion of the resilient body includes a divider having third density and a top layer having a fourth density, wherein the divider is disposed adjacently above the frontal portion and laterally subdivides the frontal portion into two generally symmetric sections. The top layer is disposed adjacently above the divider, the frontal portion and optionally the rear portion. Each of the symmetric sections facilitates comfort and stability for a respective thigh of the person sitting in the chair. The third density is substantially higher than the first density and preferably, the forth density is lower than the third density. Preferably, the top layer extends to the dimensions of the seat cushion.

In variations of the present invention, the frontal portion of the resilient body includes a divider having third density and a bottom layer having a fourth density, wherein the divider is disposed adjacently below the frontal portion and laterally subdivides the frontal portion into two generally symmetric sections. The bottom layer is disposed adjacently below the divider, the frontal portion and optionally the rear portion. Each of the symmetric sections facilitates comfort and stability for a respective thigh of the person sitting in the chair. The third density is substantially higher than the first density and preferably, the forth density is higher than the third density. Preferably, the top layer extends to the dimensions of the seat cushion.

BRIEF DESCRIPTION OF THE DRAWINGS

The present invention will become fully understood from the detailed description given herein below and the accompanying drawings, which are given by way of illustration and example only and thus not limitative of the present invention, and wherein.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided, so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The methods and examples provided herein are illustrative only and not intended to be limiting.

By way of introduction, the principal intentions of the present invention include providing seat cushions that prevent a seated handicapped individual from sliding forward on the seat.

Figure 1:
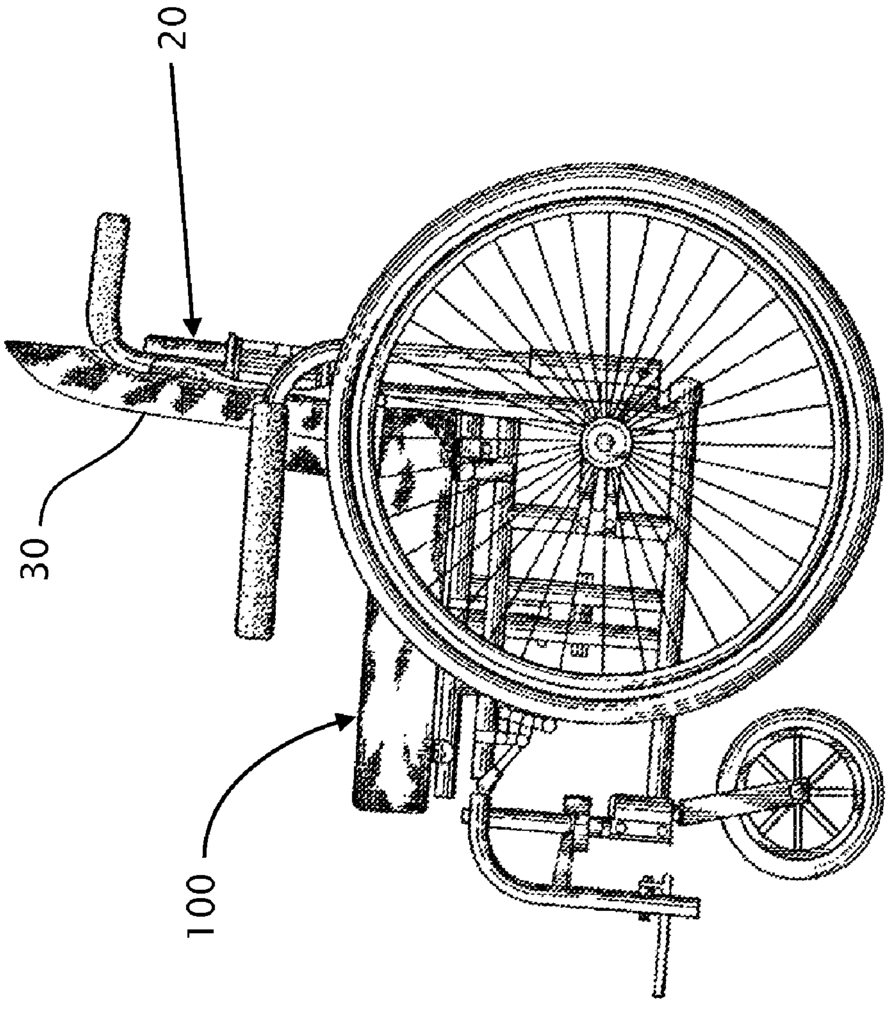
FIG. 1 illustrates a wheelchair with a seat cushion, according to embodiments of the present invention.
Figure 2:
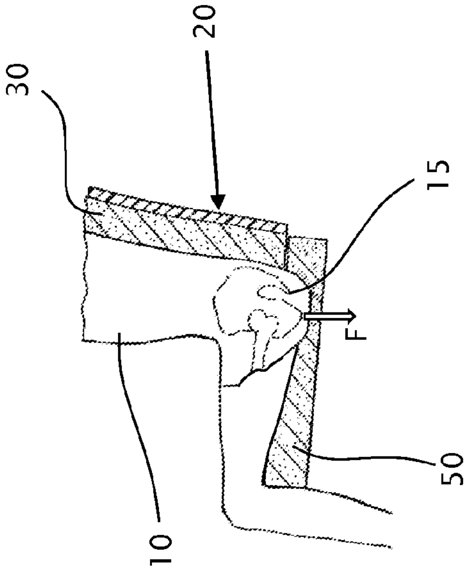
Fig 2 PRIOR ART
FIG. 2 (prior art) is a cross-sectioned view showing a person properly positioned in a wheelchair seating system.
Figure 5:
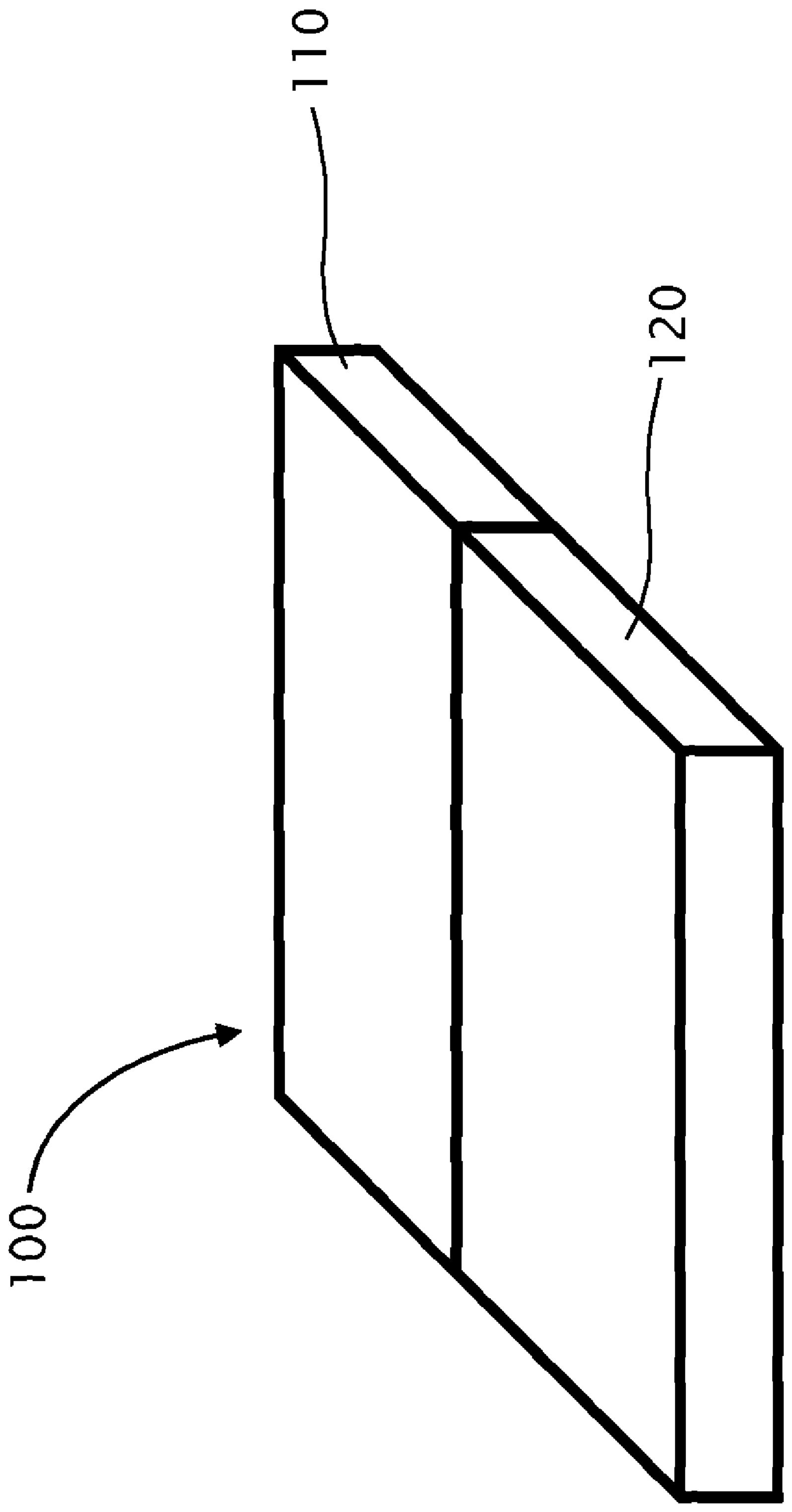
FIG. 5 is a perspective view illustration of a seat cushion, according to variations of the present invention.

Reference is now made to the drawings. FIG. 1 illustrates a wheelchair 20 with seat cushion 100, according to variations of the present invention. FIG. 5 is a perspective view of seat cushion 100 (having the cushion cover removed). Seat cushion 100 has a generally rectangular-cuboid-shaped body that includes a frontal portion 120 and a rear portion 110. Frontal portion 120 and rear portion 110 are made of resilient materials, wherein frontal portion 120 is more rigid than rear portion 110.

Rear portion 110 has a front end and a rear end, wherein the rear end of rear portion 110 is proximal to back 30 of wheelchair 20 and the front end of rear portion 110 is most distal from back 30 of wheelchair 20. Frontal portion 120 has a front end and a rear end, wherein the front end of frontal portion 120 is most distal from back 30 of wheelchair 20 and the rear end of frontal portion 120 is most proximal to back 30 of wheelchair 20. The front end of rear portion 110 is disposed adjacent to the rear end of frontal portion 120 and preferably, securely attached to the rear end of frontal portion 120.

Figure 3:
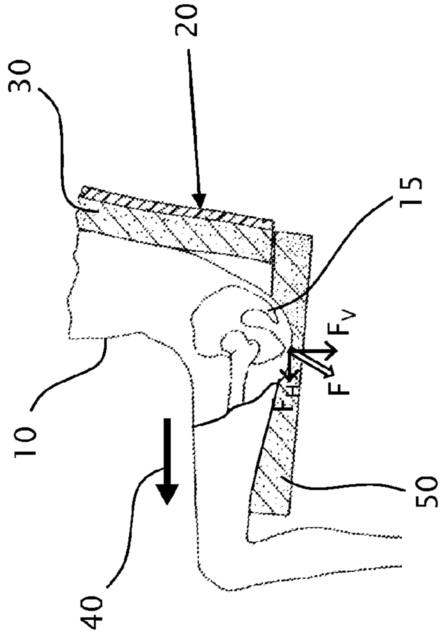
Fig 3 PRIOR ART
FIG. 3 (prior art) is a cross-sectioned view showing a person who has slid forward and thereby improperly positioned in a wheelchair seating system.
Figure 4:
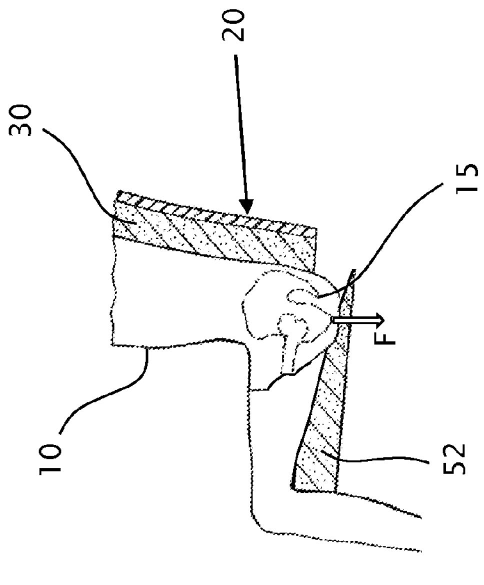
Fig 4 PRIOR ART
FIG. 4 (prior art) is a cross-sectioned view showing a person who is seating on a wedge seat cushion, which is designed to prevent a seated handicapped individual from sliding forward on the seat.
Figure 6:
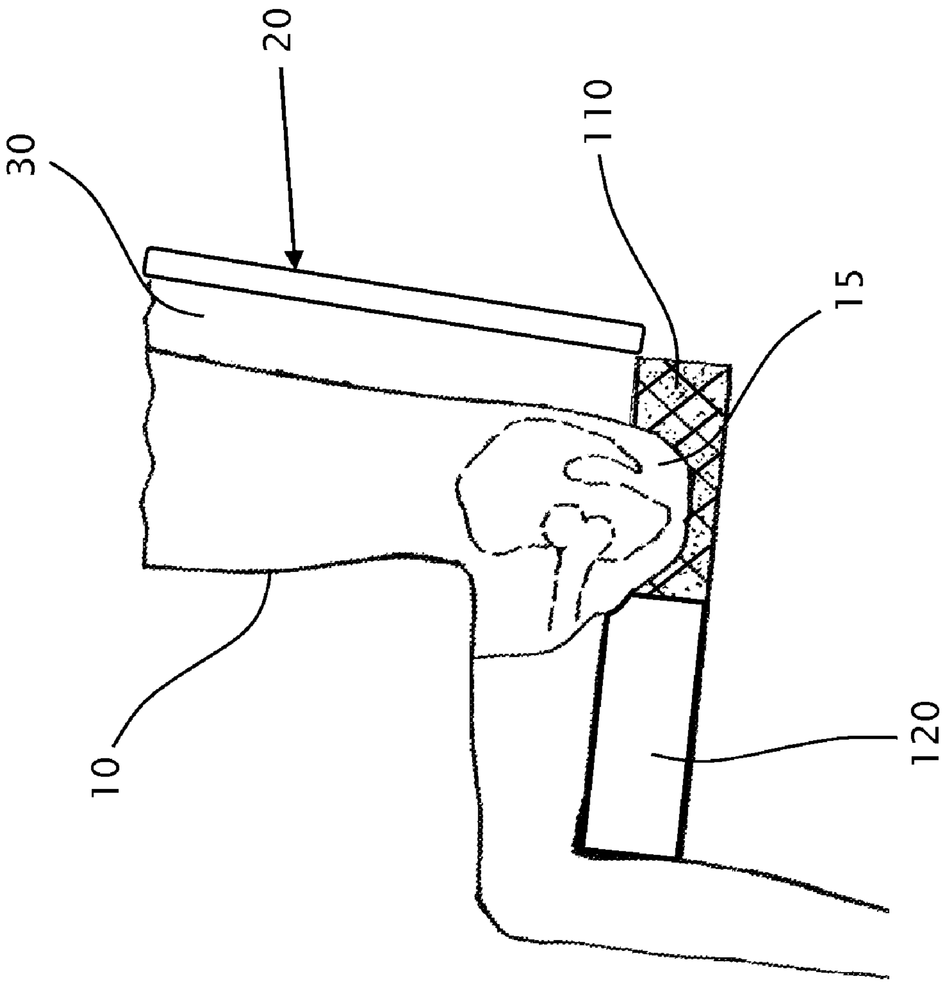
FIG. 6 is a cross-sectioned view showing a person properly positioned and held in a wheelchair seating system having the seat cushion shown in FIG. 5.

FIG. 6 is a cross-sectioned view showing person 10 properly positioned and held in wheelchair 20 seating system, utilizing seat cushion 100. The back of person 10 is supported by back 30 of wheelchair 20. Pelvis 15 supported by both the lower end of back 30 and rear portion 110 of seat cushion 100, disposed proximal to back 30. Frontal portion 120, being more rigid than rear portion 110, further supports pelvis 15 such that frontal portion 120 prevents pelvis 15 from sliding forward (direction 40 in FIG. 3) on seat cushion 100.

Figure 7:
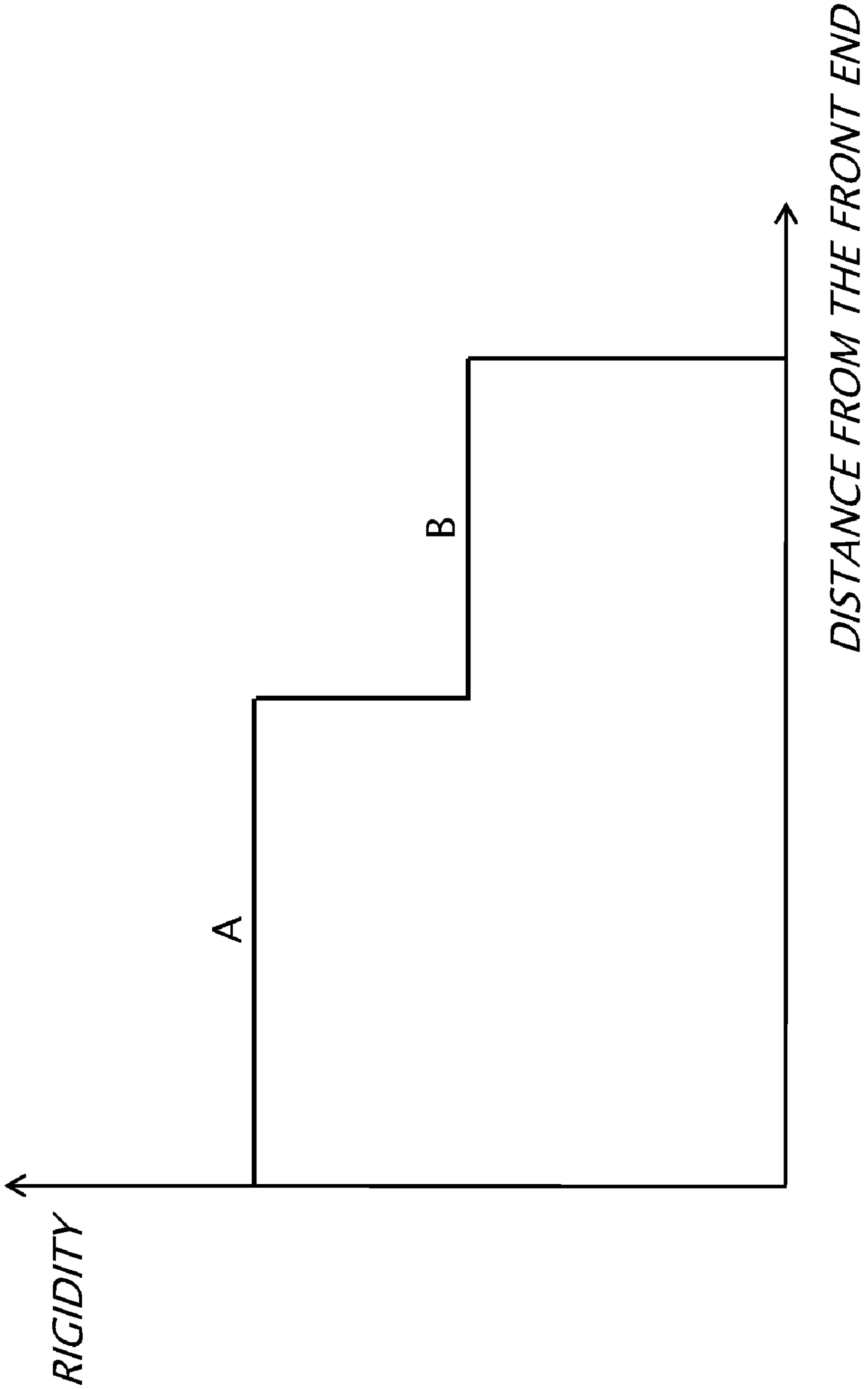
FIG. 7 is a graphical chart showing the rigidity of the seat cushion shown in FIG. 5, vs. the distance of a position on the seat cushion from its front end.

FIG. 7 is a graphical chart showing the rigidity of seat cushion 100, vs. the distance of positions on seat cushion 100 from the front end of seat cushion 100. Part A exemplifies the rigidity of frontal portion 120 and part B exemplifies the rigidity of rear portion 110.

Figure 8:
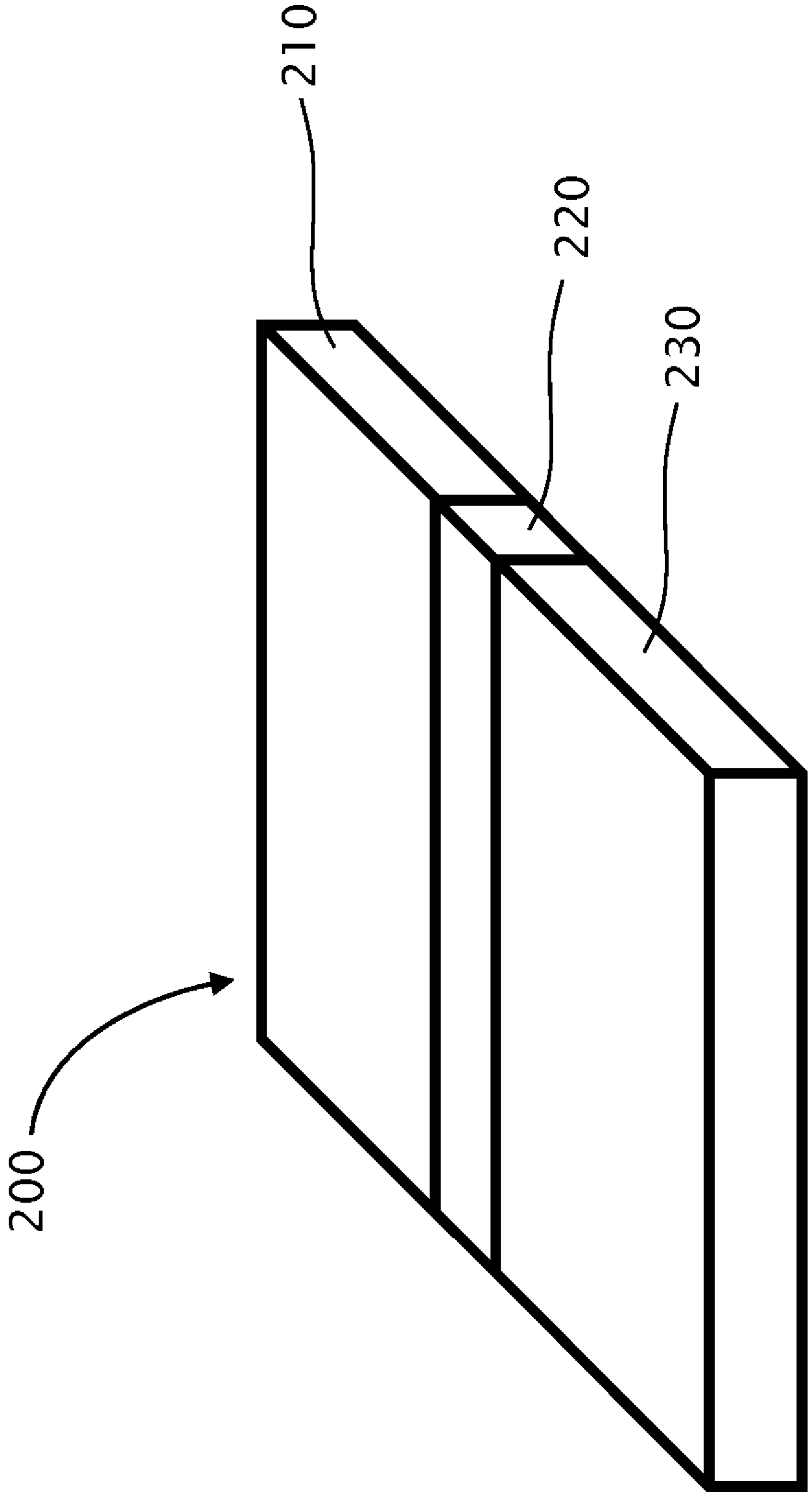
FIG. 8 is a perspective view illustration of a seat cushion, according to other variations of the present invention.

FIG. 8 is a perspective view of seat cushion 200 (having the cushion cover removed). Seat cushion 200 has a generally rectangular-cuboid-shaped body that includes a frontal portion 230, a middle portion 220 and a rear portion 210, all of which are made of resilient materials. Frontal portion 230 is more rigid than middle portion 220 and middle portion 220 is more rigid than rear portion 210.

Rear portion 210 has a front end and a rear end, wherein the rear end of rear portion 210 is proximal to back 30 of wheelchair 20 and the front end of rear portion 210 is most distal from back 30 of wheelchair 20. Middle portion 220 has a front end and a rear end, wherein the front end of middle portion 220 is most distal from back 30 of wheelchair 20 and the rear end of middle portion 220 is most proximal to back 30 of wheelchair 20. Frontal portion 230 has a front end and a rear end, wherein the front end of frontal portion 230 is most distal from back 30 of wheelchair 20 and the rear end of frontal portion 230 is most proximal to back 30 of wheelchair 20.

The front end of rear portion 210 is disposed adjacent to the rear end of middle portion 220 and preferably, securely attached to the rear end of middle portion 220. The front end of middle portion 220 is disposed adjacent to the rear end of front portion 230 and preferably, securely attached to the rear end of front portion 230.

Figure 9:
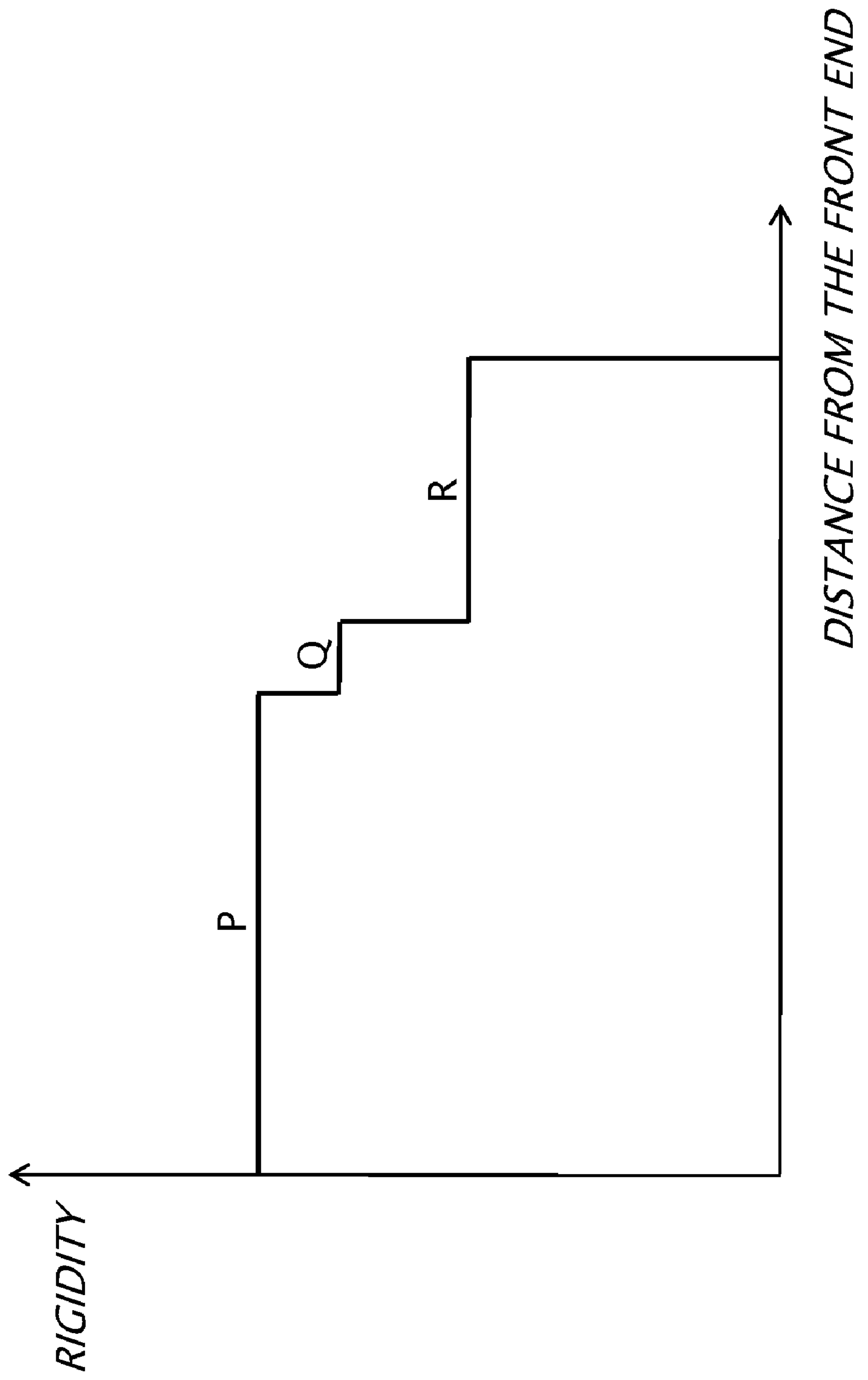
FIG. 9 is a graphical chart showing the rigidity of the seat cushion shown in FIG. 8, vs. the distance of a position on the seat cushion from its front end.

FIG. 9 is a graphical chart showing the rigidity of seat cushion 200, vs. the distance of positions on seat cushion 200 from the front end of seat cushion 100. Part P exemplifies the rigidity of frontal portion 230, part Q exemplifies the rigidity of middle portion 220 and part R exemplifies the rigidity of rear portion 210.

Figure 10:
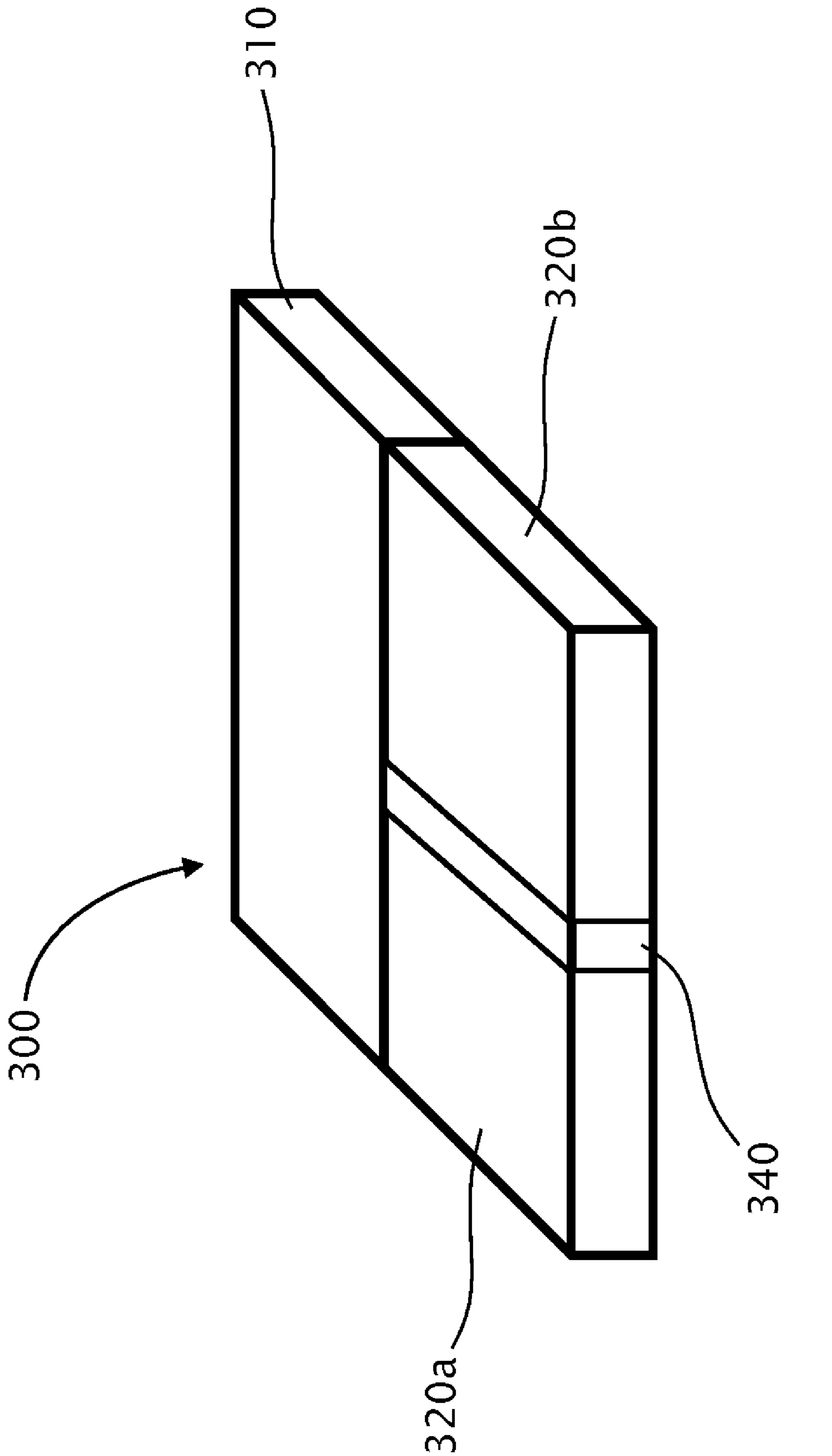
FIG. 10 is a perspective view illustration of a seat cushion, according to another variation of the present invention.

Reference is now made to FIG. 10, which is a perspective view of seat cushion 300 (having the cushion cover removed). Seat cushion 300 has a generally rectangular-cuboid-shaped body that includes frontal portion 320 and rear portion 310, all of which are made of resilient materials. Frontal portion 320 is more rigid than rear portion 310.

Rear portion 310 has a front end and a rear end, wherein the rear end of rear portion 310 is proximal to back 30 of wheelchair 20 and the front end of rear portion 310 is most distal from back 30 of wheelchair 20. Frontal portion 320 has a front end and a rear end, wherein the front end of frontal portion 320 is most distal from back 30 of wheelchair 20 and the rear end of frontal portion 320 is most proximal to back 30 of wheelchair 20. The front end of rear portion 310 is disposed adjacent to the rear end of front portion 320 and preferably, securely attached to the rear end of front portion 320.

Frontal portion 320 further includes a divider 340, having a front end and a rear end, wherein divider 340 is more rigid than frontal portion 320; wherein the front end of divider 340 is preferably flush with the front end of frontal portion 320, and the rear end of divider 340 is preferably flush with the rear end of frontal portion 320. Preferably, divider 340 laterally subdivides frontal portion 320 into two generally symmetric sections 320*a* and 320*b*. Divider 340 further enhances seat cushion 300 such that divider 340 further the sliding forward of a seated individual 10.

Figure 11:
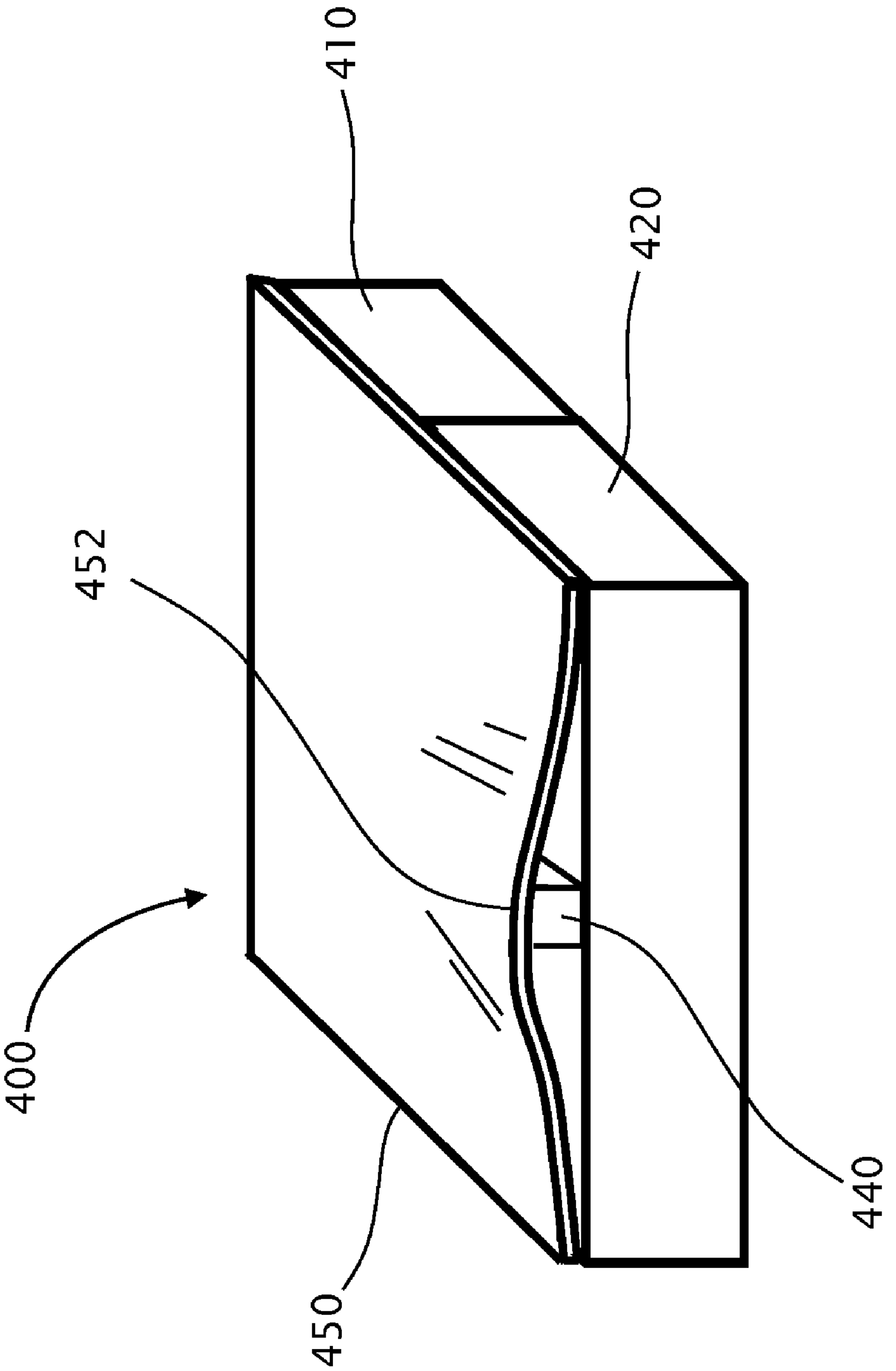
FIG. 11 is a perspective view illustration of a seat cushion, according to yet another variation of the present invention.

Reference is now made to FIG. 11, which is a perspective view illustration of a seat cushion 400 (having the cushion cover removed), according to another variation of the present invention, seat cushion 400 being in a non-seated state. Seat cushion 400 has a generally rectangular-cuboid-shaped body that includes frontal portion 420 and rear portion 410, all of which are made of resilient materials. Frontal portion 420 is more rigid than rear portion 410.

Rear portion 410 has a front end and a rear end, wherein the rear end of rear portion 410 is proximal to back 30 of wheelchair 20 and the front end of rear portion 410 is most distal from back 30 of wheelchair 20. Frontal portion 420 has a top face, a bottom face, a front end and a rear end, wherein the front end of frontal portion 420 is most distal from back 30 of wheelchair 20 and the rear end of frontal portion 420 is most proximal to back 30 of wheelchair 20. The front end of rear portion 410 is disposed adjacent to the rear end of front portion 420 and preferably, securely attached to the rear end of front portion 420.

Seat cushion 400 further includes a divider 440, which divider 440 is more rigid than frontal portion 420. Divider 440 is disposed adjacently above frontal portion 420 and a top layer 450, attached to the top surface frontal portion 420. Divider 440 is extends from approximately the front end of frontal portion 420 to generally the rear end of frontal portion 420. Preferably, top layer 450 is less rigid than divider 440. Preferably, divider 440 is disposed generally at the lateral middle of frontal portion 420.

When an individual 10 seats on top of top layer, top layer 450 presses divider 440 downwardly, against divider 440 and thereby against the top face of front portion 420. Since top layer 450 is softer than divider 440, a protrusion 452 is formed in the front section of top layer 450. Divider 440 further enhances seat cushion 400 as protrusion 452 further prevents the sliding forward of the seated individual 10.

Figure 12:
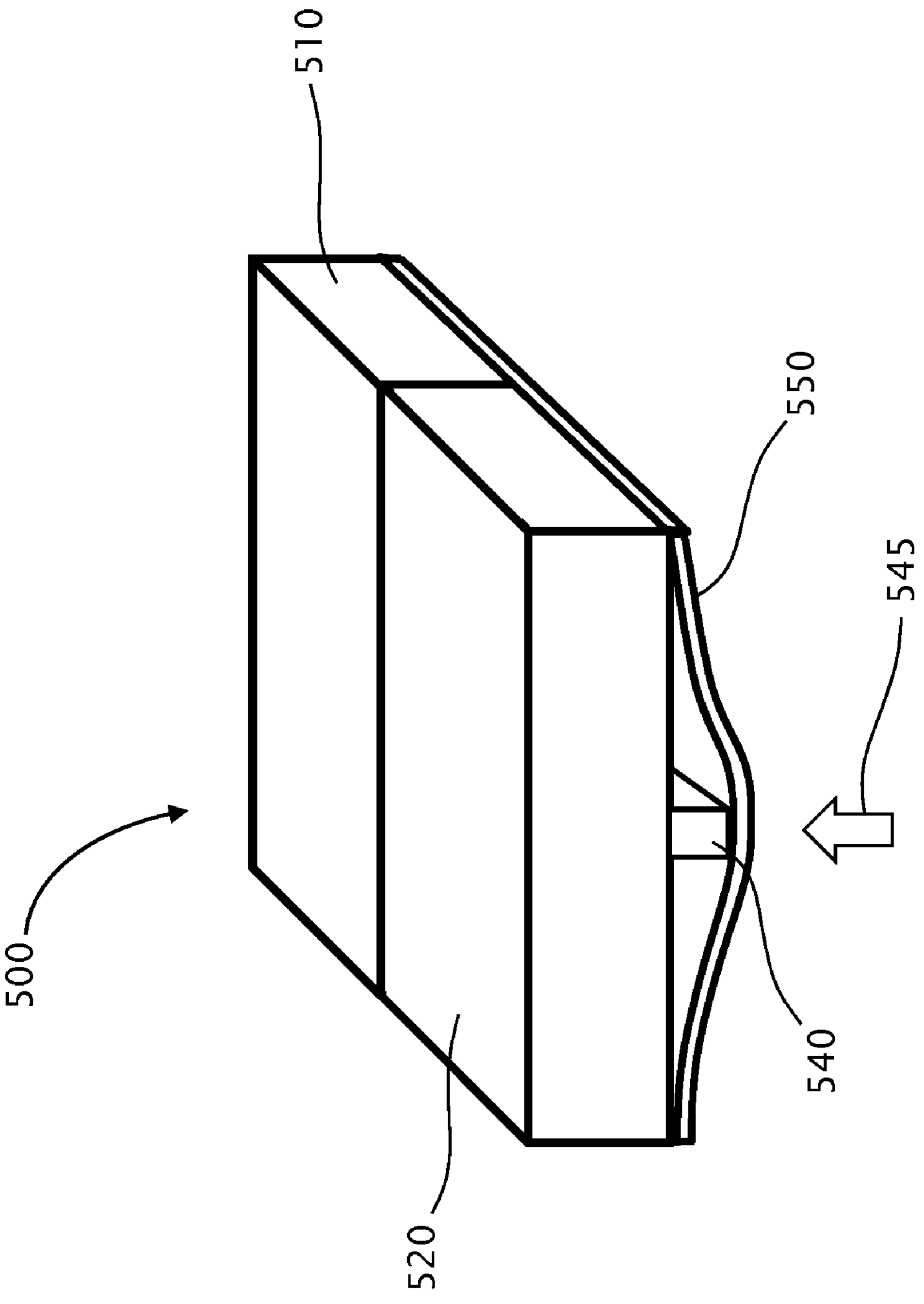
FIG. 12 is a perspective view illustration of a seat cushion, according to still another variation of the present invention, the seat cushion being in a non-seated state.
Figure 13:
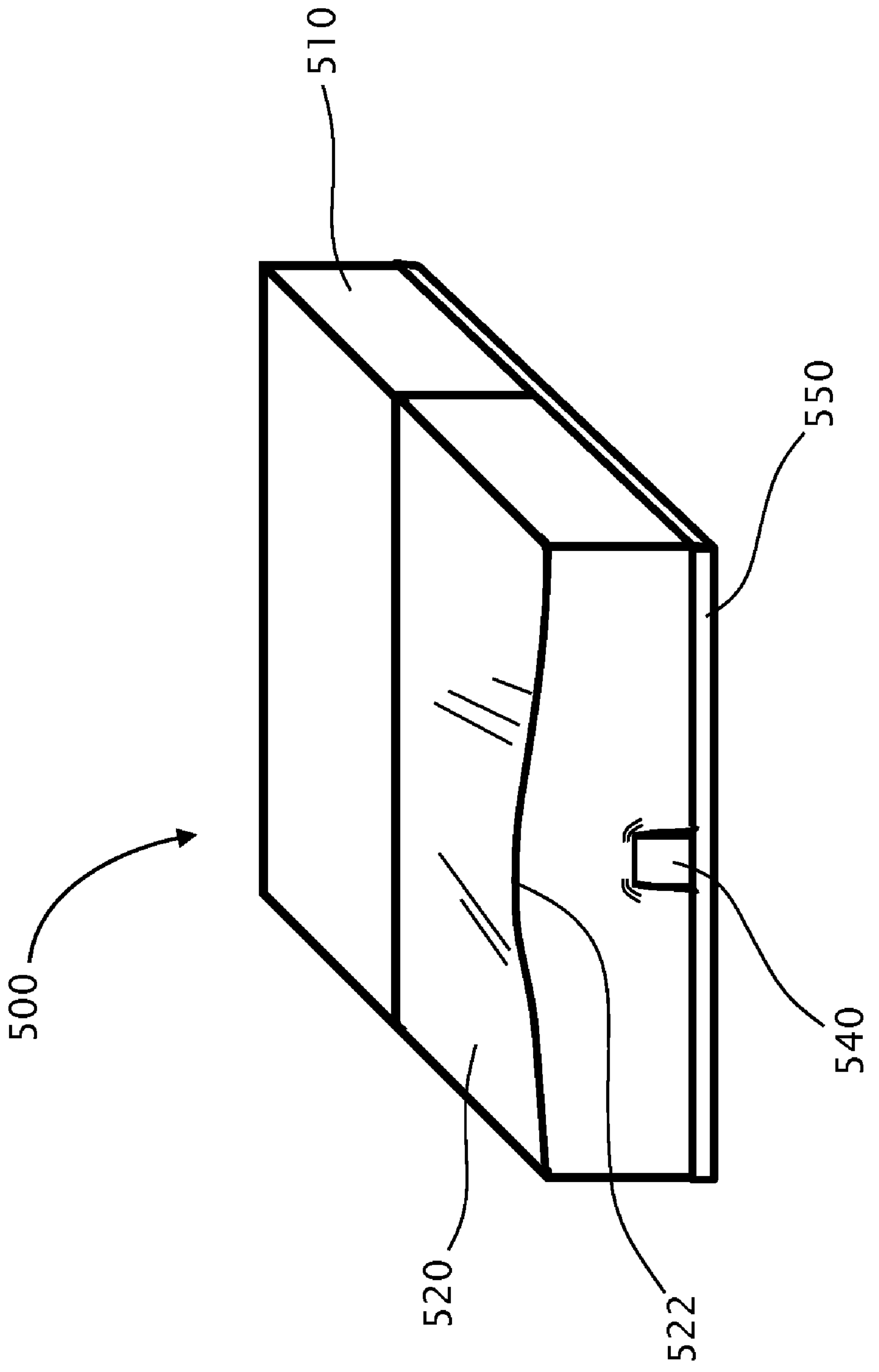
FIG. 13 is a perspective view illustration of the seat cushion shown in FIG. 11, the seat cushion being in a seated state.

Reference is now made to FIG. 12, which is a perspective view illustration of a seat cushion 500 (having the cushion cover removed), according to still another variation of the present invention, seat cushion 500 being in a non-seated state. FIG. 13 is a perspective view illustration of seat cushion 500 being in a seated state. Seat cushion 500 has a generally rectangular-cuboid-shaped body that includes frontal portion 520 and rear portion 510, all of which are made of resilient materials. Frontal portion 520 is more rigid than rear portion 510.

Rear portion 510 has a front end and a rear end, wherein the rear end of rear portion 510 is proximal to back 30 of wheelchair 20 and the front end of rear portion 510 is most distal from back 30 of wheelchair 20. Frontal portion 520 has a top face, a bottom face, a front end and a rear end, wherein the front end of frontal portion 520 is most distal from back 30 of wheelchair 20 and the rear end of frontal portion 520 is most proximal to back 30 of wheelchair 20. The front end of rear portion 510 is disposed adjacent to the rear end of front portion 520 and preferably, securely attached to the rear end of front portion 520.

Seat cushion 500 further includes a divider 540, which divider 540 is more rigid than frontal portion 520. Divider 540 is disposed adjacently below frontal portion 520 and bottom layer 550, pressing divider 540 upwards, against the bottom face of front portion 520. Preferably, bottom layer 550 is more rigid than divider 540. Preferably, divider 540 is disposed generally at the lateral middle of frontal portion 520.

When an individual 10 seats on top of seat cushion 500, the flat hard top of wheelchair 20 presses bottom layer 550 upwardly, in the general direction 545. Thereby, bottom layer 550 presses divider 540 upwardly, against the bottom face of front portion 520. Since front portion 520 is softer than divider 540, divider 540 pushes the middle section of the bottom face of front portion 520 upwardly, whereby causing the middle section of the top face of front portion 520 upwardly, forming a protrusion 522 of the top face of front portion 520. Divider 540 further enhances seat cushion 500 as protrusion 522 further prevents the sliding forward of the seated individual 10.

In variations of the present invention and according to the preferred embodiment of the present invention, bottom layer 550 is substantially more rigid than divider 540. At assembly time, divider 540 is pressed upwardly by bottom layer 550, in the general direction 545, against the bottom face of front portion 520. Since front portion 520 is softer than divider 540, divider 540 pushes the middle section of the bottom face of front portion 520 upwardly, whereby causing the middle section of the top face of front portion 520 upwardly, forming a protrusion 522 of the top face of front portion 520. All layers are securely attached in that position, for example by glue.

It should be noted that in other variations of the seat cushion of the present invention, the seat cushion is composed of any number of multiple resilient portions, each having a density that decreases from portion to portion, as the portion is disposed nearer to back 30 of wheelchair 20.

It should be noted that the elastic portions of the seat cushion of the present invention can be made of any elastic materials, including, but not limited to, elastomeric materials, for example, viscoelastic materials.

In variations of the present invention, the rigidity of all portions of seat cushion 500, 400, 300, 200 and/or seat cushion 100 are fitted to the weight range of seated individual 10.

In variations of the present invention, more rigid margins are add to the sides of seat cushion 500, 400, 300, 200 and/or seat cushion 100, to prevent sideways sliding of a seated individual 10.

In variations of the present invention, more rigid margins are add to the sides of seat cushion 500, 400, 300, 200 and/or seat cushion 100 are coupled to a chair which is not a wheelchair, to prevent seated individual 10 from sliding off the seat.

Preferably, seat cushions 100, 200, 300, 400 and/or 500 are securely attached to back 30 of wheelchair 20.

The invention being thus described in terms of several embodiments and examples, it will be obvious that the same may be varied in many ways. Such variations are not to be regarded as a departure from the spirit and scope of the invention, and all such modifications as would be obvious to one skilled in the art.

What is claimed is:

1. A seat cushion for supporting a person seated on a chair, comprising a resilient body having a generally rectangular-cuboid-shape, said resilient body comprising:

a) a frontal portion having a front end and a rear end, and is fabricated from materials having a first density, wherein said first density is substantially uniform throughout said frontal portion, along any path perpendicular to said front end of said frontal portion; and b) a rear portion having a front end and a rear end, and is fabricated from materials having a second density, wherein said second density is substantially uniform throughout said rear portion, along any path perpendicular to said rear end of said rear portion, wherein said frontal portion comprises a divider having third density and wherein said divider laterally subdivides said frontal portion into two generally symmetric sections;

wherein said frontal portion is distal from the back of said chair;

wherein said rear portion is proximal to said back of said chair;

wherein said front end of said rear portion is disposed adjacent to said rear end of said frontal portion; and wherein said first density is substantially higher than said second density;

wherein said third density is substantially higher than said first density.

2. The seat cushion as in claim 1, wherein said front end of said rear portion is securely attached to said rear end of said frontal portion.

3. The seat cushion as in claim 1, wherein said chair is a wheelchair.

4. The seat cushion as in claim 1, wherein said resilient body fabricated out of a sturdy foam material.

5. The seat cushion as in claim 1 further comprising a protective cover wrapping said resilient body.

6. The seat cushion as in claim 1 further comprising one or more intermediate portions, disposed between said frontal portion and said rear portion, wherein all of said portions maintain a gradual decrease in density starting at said front portion and ending at said rear portion.

7. The seat cushion as in claim 1, wherein said seat cushion is securely attached to said back of said chair.

8. The seat cushion as in claim 1 further comprising a top layer having a forth density, wherein said divider is disposed adjacently above said frontal portion and laterally subdivides said frontal portion into two generally symmetric sections;

wherein said top layer is disposed adjacently above said divider and said frontal portion; and wherein each of said symmetric sections facilitates comfort and stability for a respective thigh of said person sitting in said chair.

9. The seat cushion as in claim 8, wherein said forth density is higher than said third density.

10. The seat cushion as in claim 8, wherein said top layer extends to the dimensions of the seat cushion.

11. The seat cushion as in claim 1 further comprising a bottom layer having a forth density, wherein said divider is disposed adjacently below said frontal portion and laterally subdivides said frontal portion into two generally symmetric sections;

wherein said bottom layer is disposed adjacently below said divider and said frontal portion; and wherein each of said symmetric sections facilitates comfort and stability for a respective thigh of said person sitting in said chair.

12. The seat cushion as in claim 11, wherein said forth density is higher than said third density.

13. The seat cushion as in claim 12, wherein said divider is pressed upwardly by said bottom layer against the bottom face of said front portion, thereby pushing the middle section of said bottom face of said front portion upwardly, whereby causing the middle section of the top face of said front portion to be pushed upwardly, forming a protrusion of said top face of said front portion.

14. The seat cushion as in claim 13, wherein said bottom layer is securely attached to said bottom face of said front portion.

15. The seat cushion as in claim 11, wherein said bottom layer extends to the dimensions of the seat cushion.

* * * * *